Dec. 3, 1968
R. L. ATKIN
3,413,897
OIL GALLERY EQUIPPED PISTONS AND METHODS OF MAKING SAME
Filed June 17, 1965
2 Sheets-Sheet 1
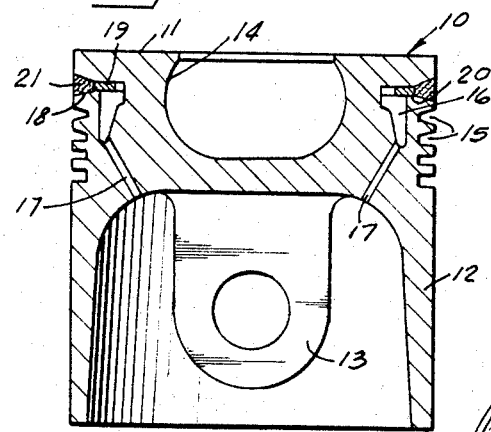
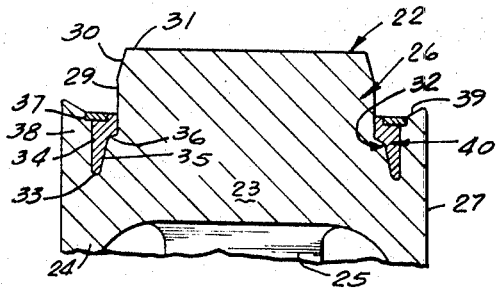
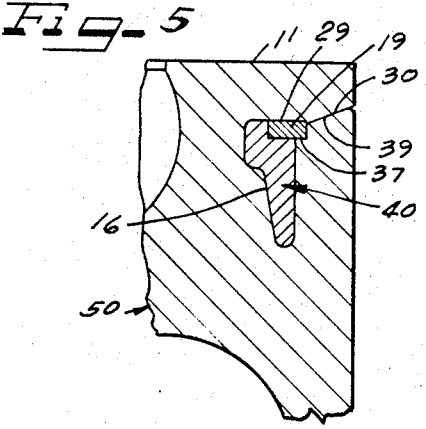
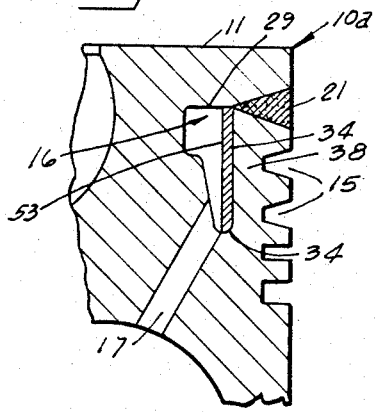
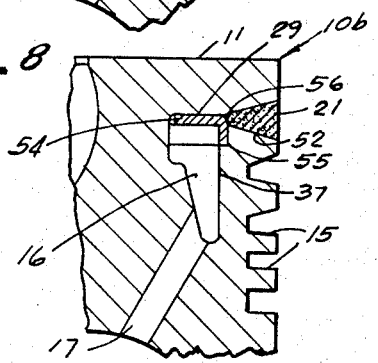
INVENTOR.
RUPERT L. ATKIN
BY *Hill, Sherman, Meroni, Gross & Simpson* ATTORNEYS Dec. 3, 1968  R. L. ATKIN  3,413,897
OIL GALLERY EQUIPPED PISTONS AND METHODS OF MAKING SAME
Filed June 17, 1965  2 Sheets-Sheet 2
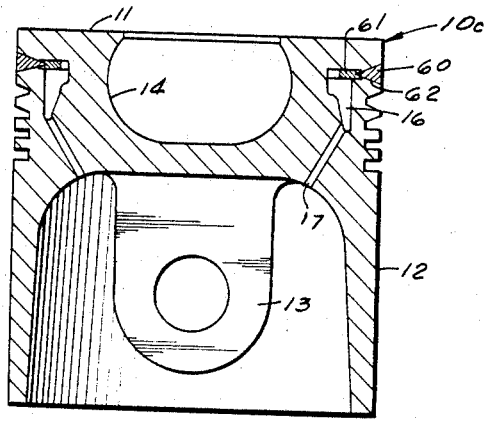
Fig. 9
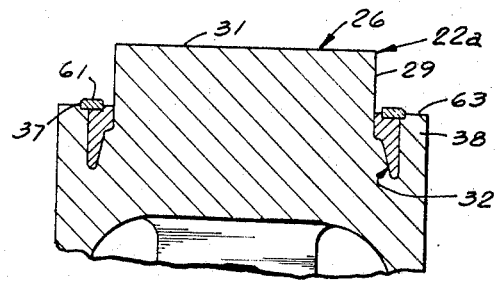
Fig. 10
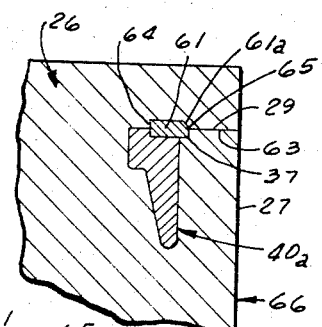
Fig. 12
Fig. 11
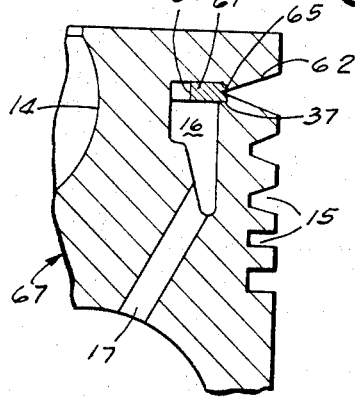
Fig. 13
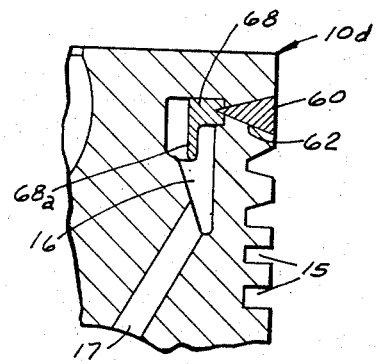
Fig. 14
INVENTOR.
RUPERT L. ATKIN
BY ATTORNEYS United States Patent Office 3,413,897
Patented Dec. 3, 1968

3,413,897
OIL GALLERY EQUIPPED PISTONS AND
METHODS OF MAKING SAME
Rupert L. Atkin, Grosse Pointe Woods, Mich., assignor to TRW Inc., Cleveland, Ohio, a corporation of Ohio
Filed June 17, 1965, Ser. No. 464,781
12 Claims. (Cl. 92—186)

ABSTRACT OF THE DISCLOSURE

An oil gallery piston having an annular internal oil gallery surrounded by a peripheral groove extending to the circumferential exterior surface of the piston, the groove being closed with a weld and the gallery being closed from the weld material by a backup ring. The backup ring is inserted into the gallery groove prior to the formation of the gallery as a high-temperature melting part of a low-temperature melting gallery-forming core which is later evacuated to form the gallery.

This invention relates generally to oil gallery equipped pistons and more specifically to forged one-piece single weld gallery type engine pistons and a method of making the same which insures a sound weld.

Engine pistons have heretofore been provided with annular chambers or oil galleries in the head and ring belt areas thereof for improving the cooling of the head area. These chambers or galleries must be completely sealed from the exterior of the piston as by welding or the like. Heretofore it has been very difficult to uniformly obtain sound welds in mass production of gallery pistons because of impurities in the gallery or chamber to be sealed by the weld. This difficulty has been especially encountered when the galleries are formed by the so-called "forged-in" process where the piston is forged around a low melting core composed of zinc or other low melting metal and shaped to define the chamber or gallery. The core is then melted or dissolved out of the piston but in commercial production some residue may remain in the chamber which contaminates any closure weld, frequently decreasing its strength to such a degree that it would not maintain a seal in use. Further, since the area to be welded opened directly into the gallery, the weld would often "blow through" and flow molten welding metal into the chamber where it would decrease or block the flow of oil and, of course, interfere with the cooling efficiency of the piston. Another difficulty encountered was the inability to maintain a constant dimension between the outside (O.D.) of the piston and the periphery of the gallery chamber rendering it impossible to position the welding tool at the optimum distance from the inner end of the groove all around the piston to insure sound uniform weld bonds.

In accordance with this invention sound sealing welds for oil gallery pistons are insured by incorporating a backup ring in the gallery chamber which is effective to close off any communication between the groove for the welding metal and the interior of the gallery. The backup ring is so seated in the gallery that it will remain in a position for separating the weld groove and the interior of the gallery even when the core material is removed. If any core material should remain in the gallery it, of course, will be held out of contact with the weld metal. The backup ring can be used as an insert in the die or mold for forming the core insert which is to shape the gallery.

A feature of the invention resides in the use of a core and backup ring assembly that will leave the backup ring in fixed relation in the gallery shaped by the core when the core material is removed. This can be done in several ways as by extending the backup ring beyond the outer periphery of the core ring so that the extended portion may seat in a counterbore or recess in the piston head. Another way of accomplishing fixation of the backup ring is to have it extend around the core for the full height of the gallery to be formed. Still another arrangement would be to rely on a press-fit locking of the backup ring to the piston.

Another important feature of the invention is the providing of uniform weld bonds for closing the galleries of pistons by securing a backup ring in the periphery of the gallery and machining a weld groove to an arbitrary constant depth into the ring thereby consistently producing weld grooves having inner peripheries concentric with the O.D. of the piston blank. The welding electrode can then be located at the optimum distance from the bottom of the groove and the weld can extend into the ring to further secure the ring in the piston and to increase the heat transfer from the gallery.

It is then an object of this invention to provide oil gallery equipped pistons with backup rings which insure the formation of sound closing weld seals for the galleries.

A further object of this invention is to provide pistons with forged-in galleries closed by single welds which are held out of communication with the interior of the gallery by a backup ring.

Another object of this invention is to provide a method of making oil gallery equipped pistons which insures against failures in sealing welds which close the galleries.

A specific object of this invention is to provide a method of making aluminum pistons with annular oil galleries around the heads thereof extending into the ring band area and equipped with metal backup rings which close off communication between the gallery and a closure weld surrounding the gallery.

Another specific object of this invention is to provide a metal article with annular chambers closed by an annular weld and having a backup ring secured therein which prevents contact of the weld metal with the interior of the chamber.

Other and further objects of this invention will be apparent to those skilled in this art from the following detailed description of the annexed sheet of drawings which, by way of preferred examples only, illustrates several embodiments of the invention.

On the drawings:

FIGURE 1 is a vertical cross sectional view of a metal piston for internal combustion engines equipped with an oil gallery closed by a single annular weld held out of contact with the gallery interior by a metal backup ring.

FIGURE 2 is a fragmentary longitudinal cross sectional view of a blank for forming the piston of FIG. 1 showing the core and backup ring mounted therein.

FIGURE 3 is a bottom plan view of the core and backup ring unit mounted in the blank of FIG. 2.

FIGURE 4 is a cross sectional view of the unit of FIG. 3 taken along the line IV—IV of FIG. 3.

FIGURE 5 is a fragmentary cross sectional view of a portion of the blank of FIG. 1 after it has been forged to close the oil gallery.

FIGURE 6 is a view similar to FIG. 5 but illustrating the blank after it has been machined to provide the weld groove, piston ring grooves, and oil holes and after the core material has been removed from the gallery through the oil holes.

FIGURE 7 is a fragmentary view of another form of backup ring arrangement for oil gallery pistons according to this invention.

FIGURE 8 is a view similar to FIG. 7 but illustrating still another form of backup ring according to this invention.

FIGURE 9 is a vertical cross sectional view, similar to FIG. 1, of another piston of this invention having the weld extending into the backup ring.

FIGURE 10 is a fragmentary longitudinal cross sectional view, similar to FIG. 2, of the blank for forming the piston of FIG. 9 and showing the core and backup ring mounted therein.

FIGURE 11 is a cross sectional view of the core and backup ring unit mounted in the blank of FIG. 10.

FIGURE 12 is a fragmentary cross sectional view, similar to FIG. 5, illustrating a portion of the blank of FIG. 10 after it has been forged to close the oil gallery.

FIGURE 13 is a view similar to FIG. 12 but illustrating the blank after it has been machined to provide the weld groove extending into the backup ring and also further machined to provide the piston ring grooves and the oil holes, and after the core material has been removed from the gallery through the oil holes.

FIGURE 14 is a view similar to FIG. 13 but illustrating another shape for the backup ring and further illustrating the weld bond extending into the backup ring.

As shown on the drawings:

The piston 10 of FIG. 1 is a one-piece forging or forged casting preferably composed of an aluminum alloy with a high silicon content. The piston 10 has a head 11, a depending generally cylindrical skirt 12 and thickened pin bosses such as 13 depending from the head inside of the skirt on diametrically opposite sides thereof.

The head 11 has a central depression or recess 14 therein and a plurality of piston ring grooves 15 are formed around the head along the so-called ring belt area of the head. An annular oil gallery chamber 16 is provided in the head 11 between the recess 14 and the bottoms of the grooves 15. The gallery 16 extends from adjacent the top of the head downwardly along the ring belt area and oil holes 17 are provided at circumferentially spaced intervals joining the bottom of the gallery 16 with the interior of the skirt 12.

A tapered groove 18 is provided in the side of the head immediately adjacent the top thereof and above the top piston ring groove 15. This groove 18 would normally converge into communication with the top of the gallery 16 except for the metal backup ring 19 which is seated around its outer periphery in a groove 20 at the inner end of the tapered groove 18. This ring 19 blocks off the groove 18 from the gallery 16 and is firmly clamped in the groove 20 in fixed relation to the piston.

The groove 18 is filled with welding metal 21 which seals the gallery 16 from the outside of the piston and forms a strong bond with the head of the piston.

The oil gallery 16 is thus closed by a single weld 21 and weld metal is blocked off from the interior of the gallery by the backup ring 19. The gallery 16 is in free communication with the interior of the piston skirt and cooling oil can flow freely through the gallery to keep the ring belt area and the head of the piston in a cooled condition.

A preferred alloy for forming the piston 10 has the following composition with the percentages indicating parts by weight:

| | Percent |
|---|---|
| Silicon | 11.5 to 22 |
| Magnesium | .4 to .9 |
| Copper | 1.5 to 2 |
| Manganese | .4 to .9 |
| Iron | .7 maximum |
| Zinc | .4 maximum |
| Nickel | .3 to 1 |
| Aluminum, remainder. | |

The backup ring 19 can be composed of an aluminum alloy preferably of low silicon content such as AL 6061 or a commercially pure aluminum of the same type as the piston 10 or can be composed of any metal having good heat conductive properties which will withstand the operating temperatures in the head of the piston.

The metal for the weld 21 can be any suitable aluminum welding or brazing material also capable of withstanding the operating conditions of the piston.

According to this invention the piston 10 is made from a cylindrical blank 22 illustrated in FIG. 2. This blank is forged to die cast to the general shape of the piston 10 and has a solid head area 23, a depending generally cylindrical skirt 24 and depending thickened pin bosses such as 25. The head portion 23 has an upstanding cylindrical reduced diameter portion 26, concentric with the outer periphery 27 of the blank, with a generally cylindrical outer wall 29 having a top beveled portion 30 converging to a flat top 31. A groove 32 in the shape of the gallery 16 is machined in the blank 22 around the cylindrical wall 29 and extends into the head 23. This groove or well 32 has a narrow rounded bottom 33, a cylindrical outer wall 34 and a tapered inner wall 35 extending from the bottom and diverging from the wall 34 to an inturned shoulder 36 extending to the cylindrical wall 29 of the portion 26. The top end of the wall 34 is counterbored at 37 and the annular ring belt portion 38 surrounding the groove or weld 32 terminates in an inclined top wall 39 which is beveled to meet with the beveled end 30 of the portion 26.

The groove 32 is filled with a core unit 40 best shown in FIGS. 3 and 4. This unit 40 is composed of a body 41 of core material which can later be removed from the gallery 16 through the holes 17 and the metal backup ring 19 which remains in the gallery to block off the weld metal 21. The unit 40 snugly fits in the groove or well 32 with the outer periphery of the ring 19 being seated in the counterbore 37. As shown in FIGS. 3 and 4 the unit 40 thus has a rounded bottom nose 43 to form the rounded bottom 33 of the groove 32, a cylindrical outer wall 44 to form the groove wall 34, a tapered inner wall 45 to form the groove wall 35, a rounded inturned flange 46 to form the shoulder 36 and a cylindrical inner wall 47 to fit around the cylindrical wall 29 of reduced diameter portion 26. The backup ring 19 is secured in a groove 48 around the top of the core portion 41 and, in the illustrated embodiment, terminates flush with the top of the core portion to provide therewith a flat radial wall 49 which extends from the cylindrical wall 47 beyond the cylindrical outer wall 44. The portion of the periphery of the backup ring 19 which projects beyond the outer cylindrical wall of the core 41 snugly seats in the counterbore 37 of the well or groove 32.

The unit 40 can be conveniently die cast by laying the ring 19 in the bottom of a mold and by casting the molten core material over the ring to fill the mold and provide the shape 41.

The material of the core 41 can be any suitable metal or other material which is easily removed from the gallery 16 through the holes 17. A preferred core material is a zinc alloy having a melting temperature of from 700 to 900° F. It is preferred to coat the unit 40 with a refractory mold wash composition composed of silica flour and sodium silicate binder to insure subsequent complete removal of the core material.

The blank and core assembly of FIG. 2 is next forged to spread and flatten the portion 26 over the core and to bring the tapered faces 30 and 39 into mated engagement as shown in FIG. 5. When this is accomplished the flat head 11 of the piston 10 is provided and the cylindrical wall 29 forms the top wall of the gallery 16 and at the same time clamps the backup ring 19 in the counterbore 37. The forging operation for flattening the portion 26 is carried out at temperatures below the melting point of the core body 41 so that the core will remain intact to maintain the shape of the gallery.

A blank 50, shown in FIG. 5, is thus formed from the blank 22 of FIG. 2.

The blank 50, following the closing of the oil gallery, is next subjected to the following operations:

(1) Drill the oil holes 17.

(2) Melt and drain out the zinc core of 41 and flush the resulting cavity with a cleaner, preferably an acid.

(3) Solution and age heat treat the blank including heating at temperatures of about 940–1000° F. for 2 to 4 hours followed by a quenching in water and a precipitation hardening cycle at temperatures of about 350–450° F. for a period of from 6 to 20 hours, preferably 9 hours. After this treatment the blanks are air cooled to room temperature.

(4) The weld groove 52 is then cut into the periphery of the head at the junction point of the tapered faces 30 and 39 in the blank 50. This V-groove 52 converges from a wide open outer end to a narrow inner end bottomed by the ring 19.

(5) The sealing weld bond 21 is then formed by filling the V-groove 52 with welding metal from a welding machine. The bond 21 extends to the backup ring 19.

(6) The welded blank is next finish machined to cut the recess 14 in the head, the piston ring grooves 15 in the ring band area and to finish the O.D. of the blank.

It will be evident from FIGS. 1 and 6 that the backup ring 19 is held firmly around its entire outer periphery in the groove 20 provided by the counterbore 37 and the overlying wall 29 of the original upstanding portion 26. The ring lies tightly against this overlying wall 29 and need not extend to the inner periphery of the gallery.

In FIG. 7 there is illustrated a modified piston 10a according to this invention. Parts identical with parts described in connection with FIG. 1 have been marked with the same reference numerals. In place of a radially extending flat backup ring 19 of the piston 10, the piston 10a has an upstanding cylindrical backup ring 53 snugly engaging the outer side wall 34 of the gallery 16 and clamped between the bottom 33 and the top wall 29 of the gallery. The ring 53 thus backs up the ring band area 38 of the piston 10a along the full height of the oil gallery 16. This ring 53 can be invested in the mold for forming the core unit in the same manner as the ring 19 and when the core material is melted out of the gallery through the holes 17 the ring will remain in fixed position in the gallery.

In the embodiment 10b of FIG. 8 parts identical with the embodiment 10 of FIG. 1 have been marked with the same reference numerals. In the piston 10b the backup ring 54 takes the form of a flanged cover for the entire top of the core material and underlies the entire wall 29 of the gallery 16. The cover 54 has a depending peripheral flange or rim 55 which seats in the counterbore 37 and is clamped between the bottom of this counterbore and the wall 29 in the same manner as in the piston 10. The cover 54 because of its depending flange or rim 55 can provide an extended blocking face 56 at the inner end of the tapered weld groove 52 and can be relatively thin because the blocking off area can be partially defined by the vertical side face of the rim 55.

In the still further modified piston 10c of FIG. 9, parts identical with parts described in FIG. 1 have been marked with the same reference numerals. However, the piston 10c, unlike the piston 10, has a weld bond 60 extending into the periphery of a backup ring 61 so that the ring has an integral connection through the weld bond with the O.D. of the piston and any heat barrier that might be produced by inferior contact between the bonding metal and the backup ring metal is eliminated. In addition the backup ring 61 is more securely anchored in the oil gallery. However, the most important aspect of the feature of extending the weld bond into the periphery of the backup ring 61 is the maintenance of a uniform depth for the welding groove around the entire periphery of the groove. Thus the welding groove 62 is extended to an arbitrary depth into the periphery of the backup ring 61 and even though a constant dimension between the outer periphery of the piston and the peripheral edge of the oil gallery is not created, the grinding of the groove to a constant depth will eliminate any irregularities that would otherwise accompany the welding operation. The welding electrode can then be located at the optimum distance from the bottom of the groove and a uniform weld of great strength is assured.

The piston 10c is prepared from a modified blank 22a which is differently shaped than the blank 22 of FIG. 2 in that the reduced diameter projection 26 of the head portion has its cylindrical periphery 29 extended all the way to the top 31 thereby eliminating the taper 30. Further, the ring belt portion 38 of the blank has a radial top 63 in place of the bevel top 39 and the core unit 40a carries the backup ring 61 at a level projecting above the top of this radial shoulder 63. As best shown in FIG. 11 the backup ring 61 has a beveled top corner 61a around the outer periphery thereof. The ring 61 like the backup ring 19 projects beyond the cylindrical periphery of 44 of the unit 40a and this projection seats in the counterbore 37 of the well or groove 32 of the blank.

As shown in FIG. 12 the projected head portion 26 of the blank of FIG. 10 is flattened down to extend to the periphery 27 of the blank and the bevel 61a of the backup ring 61 assists the flow of the metal so that the wall 29 will tightly overlie the ring 61 and mate with the shoulder or radial wall 63. The junction line surrounding the ring 61 is thus radial and metal flows into tight engagement over the projection of the ring 61 forming an inner shoulder 64 tightly engaging the inner periphery of the ring and an outer shoulder 65 tightly engaging the outer periphery of the ring. The ring is thus securely clamped in fixed position with the shoulders coacting with the counterbore 34 to lock the ring in position.

The blank 66 of FIG. 12 is subjected to the same operations as the blank 50 to produce the blank 67 shown in FIG. 13. As shown in FIG. 13 the V-shaped groove 62 extends into the periphery of the ring 61 and this groove will have a uniform depth around the entire periphery of the piston. The welding gun or electrode can thus be set the optimum distance from the groove to project the welding material into the groove and obtain a uniform bond.

In the still further embodiment 10d of FIG. 14 parts corresponding with parts described in connection with FIGS. 9–13 have been marked with the same reference numerals. As shown in FIG. 14 a modified backup ring 68 is provided. This ring, like the ring 61, receives the weld bond 60 in the outer periphery thereof but, in addition, has a depending flange or fin 68a extending into the gallery 16 intermediate the inner and outer peripheries of the gallery so as to be washed with oil circulating through the gallery and provide an added cooling surface for dissipation of heat. The ring 68 can be mounted on a core such as 40 or 40a in the same manner as the rings 19 and 61 with the fin or flange 68a of course extending downwardly into the body of the core material.

From the above descriptions it will therefore be understood that this invention provides articles having hollow chambers closed with a weld, such as oil gallery equipped pistons, wherein contamination of welding material in the chamber is eliminated by backup inserts which block off the weld area from the chamber area and wherein uniform depth weld areas are insured. It will further be understood that this invention provides a method of forming the chamber and locking the backup insert in fixed position in the chamber.

Although minor modifications might be suggested by those versed in the art, it should be understod that I wish to embody within the scope of the patent warranted hereon, all such modifications as reasonably and properly come within the scope of my contribution to the art.

I claim as my invention:

1. A metal piston having a head with an annular oil gallery therein, a backup ring in said gallery, a peripheral groove around the head extending into the backup ring, a weld bond filling said groove in the head and ring sealing the gallery, and said ring coacting with the weld metal to transfer heat from the gallery while blocking off communication between the weld metal and gallery.

2. A metal engine piston which comprises a body having a head with a recessed central portion, a ring band area around the head, and a depending skirt portion, an annular oil gallery between the recessed portion and the ring band area extending along the height of said area, a V-shaped groove around the periphery of the head communicating with the interior of the gallery, a ring clamped in the gallery extending across the mouth of said groove and having a peripheral groove extending the V-groove to a constant depth around the periphery of the piston, and a weld bond filling both of said grooves.

3. A forged metal piston having an annular oil gallery around the interior of the head thereof, said gallery having a peripheral groove around the top thereof, a metal ring clamped in said groove, said head having a circumferential peripheral groove communicating with the groove of the gallery, a metal bond filling said circumferential peripheral groove of the head, and said ring being effective to block off flow of bonding metal into the gallery.

4. An oil gallery equipped metal piston having an annular oil gallery around the interior of the head thereof and a surrounding circumferential peripheral groove communicating with the gallery, an upstanding cylindrical ring clamped between the top and bottom of the gallery and overlying the mouth of the circumferential peripheral groove, and a weld bond closing the peripheral groove.

5. In an oil gallery equipped piston having a head with an annular gallery cavity therein, a counterbore in said gallery, a circumferential peripheral groove around the head communicating with the counterbore, a flat metal ring covering the top of the gallery and having a depending rim flange clamped in said counterbore and overlying the circumferential peripheral groove, and a weld bond filling said circumferential groove.

6. A core member for use in forming oil galleries in pistons and the like which comprises a ring of core material shaped to form a desired gallery configuration in a piston head, and a rigid metal ring of higher melting temperature than the core material secured to the core material and extending beyond the outer periphery thereof to provide a ledge for locking in a counterbore in the piston.

7. The method of making metal articles with closed chambers therein which comprises forming a blank with an open top groove, filling the groove with a complementary core having a high melting point insert, forging the blank to close the groove at a junction line backed by said insert, removing said core except for said insert and welding the metal at said junction, said insert preventing flow of welding metal into the groove.

8. The method of making oil gallery equipped single weld pistons which comprises forming a piston blank with a head surrounded by an oil gallery defining open top well, forming a counterbore around the top of said well, filling the well with a low melting core, seating a ring in the counterbore, forging the head over the well and counterbore, to mate the head metal with the body metal surrounding the well along a junction line communicating with said counterbore, clamping the ring in the counterbore with the head metal, cutting a V-shaped groove around the body along the junction line communicating with the counterbore, said groove extending into said ring, melting the core material out of the well, and filling the groove with weld metal.

9. The method of making weld sealed oil gallery equipped pistons which comprises forming a piston blank with an upstanding reduced diameter portion on the head end thereof, machining a well in the head of the blank at the bottom of the reduced diameter portion, filling the well with low melting core material, covering the core material with a rigid high melting backup ring, forging the reduced diameter head portion into overlying relation with the well for closing the well, cutting a groove around the piston head into the backup ring, filling the groove with welding material to seal off the resulting oil gallery from the exterior of the piston while blocking off flow of welding material into the gallery with said ring, drilling oil holes into the piston into communication with the gallery, and melting the core out of the gallery.

10. A method of manufacturing an internal combustion engine piston comprising providing a slug composed of an aluminum alloy consisting of by weight 11.5–22 percent silicon, 0.4–0.9 percent magnesium, 1.5–2.0 percent copper, 0.4–0.9 percent manganese, no greater than 0.7 percent iron, no greater than 0.4 percent zinc, 0.3 to 1 percent nickel, and the remainder being aluminum, forming a preform from said slug having a greater volume of stock near the one end that is to provide a piston head, forging the preform into a piston blank having a piston head portion with a reduced diameter portion above the top wall of said head, forming an annular axial groove concentric with and extending axially inwardly from the bottom of the reduced diameter portion a predetermined distance into the piston head, inserting a core ring of zinc alloy having a melting temperature of 700°–900° F. and a high melting temperature annular backing ring in said annular groove, flattening said upstanding portion over the core ring to close the groove, melting the zinc, draining the molten zinc from the groove, and welding the junction of said flattened portion and said head, said backing ring preventing the flow of welding metal into said groove.

11. A method of manufacturing a piston having a piston head comprising forming a cylindrical extension on the piston head face, forming a groove in said piston head face adjacent said extension, placing core means including a backing element sized to form an oil gallery shape in said groove, upsetting said piston head to close, at said backing element, said groove with said extension, removing said core means from said piston head to form the oil gallery therein, and welding the junction of said upset portion and said head, said backing element preventing flow of welding metal into said gallery.

12. A method of manufacturing a piston having a piston head with an oil gallery comprising forming an extension on the piston head face, forming a groove in said piston head face adjacent said extension having a volume equal to the volume of the oil gallery, placing form means including a backing element, equal in size to the oil gallery in said groove, upsetting said piston head to close said groove at said backing element with said extension, maintaining the size of said form ring during said upsetting operation, removing said form means except for said backing element from said piston head to form the oil gallery therein, grooving the piston around the periphery thereof, extending the groove into the backing element, and forming a weld band in the groove to weld the backing element to the piston and to seal the gallery.

References Cited

UNITED STATES PATENTS

| | | | |
|---|---|---|---|
| 3,341,924 | 9/1967 | Clary et al. | 29—156.5 |
| 3,075,817 | 1/1963 | Mayes | 29—156.5 X |
| 3,181,514 | 5/1965 | Druzynski | 92—186 X |
| 3,189,010 | 6/1965 | Isley | 92—186 X |
| 3,190,273 | 6/1965 | Bachle et al. | 92—186 X |
| 3,204,617 | 7/1965 | Hulbert | 92—186 X |

JOHN F. CAMPBELL, *Primary Examiner.*

J. L. CLINE, *Assistant Examiner.*